(12) United States Patent
Sarkar et al.

(10) Patent No.: US 10,280,372 B2
(45) Date of Patent: May 7, 2019

(54) HYDROCARBON CRACKING CATALYST AND PROCESS FOR PRODUCING LIGHT OLEFINS

(71) Applicant: INDIAN OIL CORPORATION LIMITED, Mumbai (IN)

(72) Inventors: Biswanath Sarkar, Haryana (IN); Satyen Kumar Das, Haryana (IN); Somnath Kukade, Haryana (IN); Ganga Shankar Mishra, Haryana (IN); Eswar Prasad Dalai, Haryana (IN); Velusamy Chidambaram, Haryana (IN); Sudhir Kumar Pandey, Haryana (IN); Ram Mohan Thakur, Haryana (IN); Debasis Bhattacharyya, Haryana (IN); Santanam Rajagopal, Haryana (IN)

(73) Assignee: INDIAN OIL CORPORATION LIMITED, Bandra (East) (IN)

( * ) Notice: Subject to any disclaimer, the term of this patent is extended or adjusted under 35 U.S.C. 154(b) by 27 days.

(21) Appl. No.: 15/038,603

(22) PCT Filed: Jan. 7, 2014

(86) PCT No.: PCT/IB2014/058084
§ 371 (c)(1),
(2) Date: May 23, 2016

(87) PCT Pub. No.: WO2015/075565
PCT Pub. Date: May 28, 2015

(65) Prior Publication Data
US 2016/0296925 A1   Oct. 13, 2016

(30) Foreign Application Priority Data
Nov. 21, 2013   (IN) .................. 3669/MUM/2013

(51) Int. Cl.
| | |
|---|---|
| *C10G 11/05* | (2006.01) |
| *C10G 11/18* | (2006.01) |
| *B01J 38/06* | (2006.01) |
| *B01J 38/30* | (2006.01) |
| *B01J 29/80* | (2006.01) |
| *B01J 37/00* | (2006.01) |
| *B01J 29/90* | (2006.01) |
| *B01J 38/12* | (2006.01) |
| *B01J 37/28* | (2006.01) |
| *B01J 29/08* | (2006.01) |
| *B01J 29/40* | (2006.01) |
| *B01J 37/02* | (2006.01) |

(52) U.S. Cl.
CPC .............. *C10G 11/05* (2013.01); *B01J 29/80* (2013.01); *B01J 29/90* (2013.01); *B01J 37/0045* (2013.01); *B01J 38/06* (2013.01); *B01J 38/12* (2013.01); *B01J 38/30* (2013.01); *C10G 11/18* (2013.01); *B01J 29/084* (2013.01); *B01J 29/088* (2013.01); *B01J 29/40* (2013.01); *B01J 29/405* (2013.01); *B01J 37/0203* (2013.01); *B01J 37/28* (2013.01); *B01J 2229/16* (2013.01); *B01J 2229/20* (2013.01); *B01J 2229/42* (2013.01); *C10G 2400/20* (2013.01)

(58) Field of Classification Search
CPC ................................ C10G 11/05; C10G 11/18
See application file for complete search history.

(56) References Cited

U.S. PATENT DOCUMENTS

| | | | | | |
|---|---|---|---|---|---|
| 4,477,336 | A | * | 10/1984 | Scherzer ................ | B01J 29/084 208/120.01 |
| 5,549,813 | A | * | 8/1996 | Dai ........................ | B01J 29/084 208/120.01 |
| 2004/0256291 | A1 | * | 12/2004 | Canos ..................... | B01J 29/005 208/120.01 |
| 2008/0093263 | A1 | * | 4/2008 | Cheng ..................... | B01J 29/80 208/114 |
| 2013/0175202 | A1 | * | 7/2013 | Koseoglu ................ | B01J 23/755 208/111.1 |
| 2015/0152027 | A1 | * | 6/2015 | Shafi ...................... | C10G 55/06 585/653 |

FOREIGN PATENT DOCUMENTS

CN            1354224         6/2002

OTHER PUBLICATIONS

Daou et al. Gas-phase chlorination of aromatics over FAU- and EMT-type zeolites. May 6, 2013. Catalysis Communications 39 10-13.*
G. W. Young Realistic Assesment of FCC Catalyst Performance in the Laboratory. Fluid Catalytic Cracking:Science and Technology, Studies in Surface Science and Catalysis, vol. 76 1993.*

(Continued)

*Primary Examiner* — Philip Y Louie
*Assistant Examiner* — Alyssa L Cepluch
(74) *Attorney, Agent, or Firm* — Workman Nydegger

(57) ABSTRACT

The present invention relates to a novel catalyst composition for catalytic cracking of hydrocarbon streams to enhance the yield of light olefins. The catalyst composition for the cracking of hydrocarbon feed streams to light olefins, comprises a USY zeolite with silica/alumina ratio of more than 40, pentasil zeolite, a phosphate compound and alumina silica binder. The yield of olefins is further increased when the catalyst composition is impregnated with a cerium oxide. The present invention also provides a process of increasing the yield of light olefins from hydrocarbon feed streams comprising contacting the hydrocarbon streams with catalyst compositions of the present invention.

8 Claims, No Drawings

(56) References Cited

OTHER PUBLICATIONS

Fonseca N et al: "influence of acidity on the H-Y zeolite performance in n-decane catalytic cracking: evidence of a series/parallel mechanism", Reaction Kinetics and Catalysis Letters, Springer Science + Business Media, Dordrecht, NL, vol. 100, No. 2, May 22, 2010 (May 22, 2010)m pp. 249-263, XP019829325, ISSN: 1588-2837 the whole document.
PCT/IB2014/058084, Aug. 6, 2014, International Search Report and Written Opinion.

\* cited by examiner

HYDROCARBON CRACKING CATALYST AND PROCESS FOR PRODUCING LIGHT OLEFINS

FIELD OF THE INVENTION

The present invention relates to the catalytic cracking of hydrocarbon streams to produce light olefins. Particularly, the invention refers to a novel catalyst composition for catalytic cracking of hydrocarbon streams for enhancing the yield of light olefins.

BACKGROUND OF THE INVENTION

Since long, the process of Fluid Catalytic Cracking is known to convert high-boiling point, high-molecular weight hydrocarbon fractions of petroleum crude oils to more valuable, lighter fractions gasoline, olefin gases and other products. The feedstock subjected for catalytic cracking is usually heavy gas oil or vacuum gas oil (HVGO) whose long chains break during the process in the presence of the catalyst.

US Patent Application No. 2010/0105974 describes the Catalysts comprising first molecular sieve made up from a small pore zeolite having a pore index between 13 and 26, and a second molecular sieve made up from an intermediate pore zeolite having a pore index between 26 and 30, wherein the first molecular sieve comprises between 5 and 95 wt. % of the catalyst, and the second molecular sieve comprises the remainder of the catalyst for cracking of naptha.

U.S. Pat. No. 5,846,402 also discloses a process for selective catalytic cracking of a petroleum-based feedstock to produce a product having a high yield of liquefied petroleum gas (LPG) and light olefins having 3 to 4 carbons includes providing a fluidized bed reactor which is a high velocity riser, continuously circulating fluidized bed reactor; providing a solid acidic catalyst comprised of: from 1 to 6% by wt, of ultra-stable Y-zeolite; from 8-25% by wt, of Pentasil zeolite which is shape selective; from 0-8% by wt. of an active material Which is bottom selective; from 0-1% by wt. of rare earth constituents; and from 91 to 60% by wt. of nonacidic constituents and binder; charging the fluidized bed reactor with the solid acidic catalyst and the petroleum-based feedstock; and cracking the petroleum-based feedstock in the presence of the solid acidic catalyst in the fluidized bed reactor. The process produces a LPG yield ranging up to 40 to 65 wt. % of the fresh petroleum-based feedstock, a selectivity for the light olefins of at least 40 wt. %, and a selectivity for the LPG of at least 45 wt.

Another U.S. Pat. No. 7,462,275 describes the Fluidizable catalyst comprising 5 to 40 wt. % of medium pore crystalline alumino-silicate, 0 to 10 wt. % of Y type zeolite, 0 to 5 wt. % of non-crystalline acidic material and the remaining being acidic components and binder for production of saturated LPG and off gas.

U.S. Pat. No. 6,455,750 describes the catalyst contains 20-60 wt. % of ZSM-5 molecular sieve having an average pore diameter less than 0.7 nanometer. The catalyst's steam activation Index is greater than 0.75 for the production of C3 and C2 fraction with propylene comprising at least about 90 mol % of C3 fraction and ethylene comprising 90 mol % of C2 fraction from cracked naphtha streams (C5-221° C.).

U.S. Pat. No. 6,656,345, dated Feb. 12, 2003 describes the Zeolite based catalyst selected from the group containing of medium pore zeolites having Silica to alumina ratio>200:1 and pore diameter less than 0.7 nm for the production of light olefins mainly propylene from olefinic hydrocarbon feedstock boiling in the naphtha range (18-220° C.).

Maximum ethylene and propylene yields reported in the patents from olefinic naphtha feedstock is 50 wt. %. Maximum ethylene reported from naphtha feed stream is in the range of 6 to 23 wt. % and propylene is in the range of 20-34 wt. %. Very few patents are related to paraffinic feedstocks. Maximum propylene & ethylene reported in the literature from paraffinic naphtha has been 21 wt. % and 13 wt. % respectively. However, in most of the cases, boiling point of the naphtha is in the range of 20 to 220° C. No Patent related to condensate cracking is obtained. None of the patent uses the catalyst composition having high silica/alumina (>40) ratio Y zeolite for production of light olefins.

The catalyst employed in most of the patents has been pentasil zeolite such as ZSM-5/ZSM-11 based catalyst or the zeolite modified with alkali metals etc. Some of the patents have also disclosed phosphorous to be added in ZSM-5 based catalyst. Even some of the patent considered mixture of ZSM-5 zeolite as well as USY zeolite based catalyst. Some of the patent considered dehydrogenating metal such as Ni, Pt, Pd etc. in the ZSM-5 based catalyst.

Despite various attempts Which have been made with variations in fluid catalytic cracking process and in the catalyst composition, still techniques are continually sought for improving the system in terms of the yield and efficiency.

OBJECT AND SUMMARY OF THE INVENTION

It is an object of the invention to provide novel catalyst compositions for enhancing the yield of light olefins in catalytic cracking of hydrocarbon feed.

The present invention provides a catalyst composition for cracking of hydrocarbon feed streams to light olefins, the catalyst comprising a USY zeolite with silica/alumina ratio of more than 40, pentasil zeolite, a phosphate compound, and alumina silica binder.

In another aspect, the present invention also provides a catalyst composition for cracking of hydrocarbon feed streams to light olefins, the catalyst comprising a USY zeolite with silica/alumina ratio of more than 40, pentasil zeolite, a phosphate compound, and alumina silica binder, wherein the catalyst composition is impregnated with cerium oxide. The preferred amount of cerium in the impregnated catalyst is in the range of 0.1-5 wt. % of the composition.

In preferred aspects of the invention, the pentsil zeolite in the catalyst composition is medium pore pentasil zeolite. The pentasil zeolite in the present invention is selected from ZSM-5 and/or ZSM-11 zeolite.

In a preferred aspect, the USY zeolite in the catalyst composition is large pore USY zeolite with silica/alumina ratio of more than 40. The preferred ratio of silica and alumina in the USY zeolite is in the range of 40-80.

The amount of pentasil zeolite in the present invention is in the range of 5-40 wt. % and the amount of USY zeolite is in the range of 5-20 wt. % of the composition. The phosphate is in the range of 8-15 wt. %; the alumina is in the range of 5-30 wt. %; and the silica is in the range of 5-20 wt. % of the composition.

The catalyst compositions of the present invention are capable of producing higher olefin yields, as compared to known catalysts.

The present invention also provides a process of increasing the yield of light olefins from hydrocarbon feed streams comprising contacting the hydrocarbon streams with catalyst compositions of the present invention, under catalytic cracking conditions. In preferred aspect, the present invention provides a process of increasing the yield of light olefins from hydrocarbon feed streams comprising contacting the hydrocarbon streams with catalyst compositions of the present invention, under catalytic cracking conditions at a temperature ranging from 500 to 650° C. The catalyst to hydrocarbon feed stream ratio is from 8 to 20. Further, the catalyst is continuously contacted with the hydrocarbon feed stream in a first fluidization regime of riser reactor of a circulating fluidized bed reactor regenerator system.

In an aspect of the present invention, the hydrocarbon feed stream is a condensate hydrocarbon comprising C5 to C20 hydrocarbons having saturate content within the range of 65-95%, aromatic in the range of 5-35 wt. % and with or without olefins.

In another aspect of the invention the mixture of ethylene, propylene, C4 unsaturates obtained is in the range of 39 wt. % to 55 wt % of the hydrocarbon feed stream.

DETAILED DESCRIPTION OF THE INVENTION

The present invention discloses a process of increasing the yield of light olefins from hydrocarbon feed streams comprising contacting the hydrocarbon streams or fresh hydrocarbon streams with a special type of zeolite based catalyst under catalytic cracking conditions, the said catalyst composition/system comprises high silica/alumina ratio (>40) USY zeolite, pentasil ZSM-5 zeolite bonded with phosphate and alumina silica binder. Optionally, the catalyst is impregnated with cerium or cerium oxide.

The catalyst system containing ZSM-5 zeolite along with high silica/alumina ratio (>40) USY zeolite contribute higher acid strength than the catalyst containing only ZSM-5 zeolite with the same compositions. The said catalyst system is capable of producing higher light olefin yields. Further, yield of light olefins are increased when the said catalyst was impregnated with cerium.

Feed stock for the present invention includes a wide range of hydrocarbon fractions of straight run naphtha, saturated naphtha, condensate streams, olefinic naphtha, Kerosene, light gas oil and their mixture of. The preferred types of feed stocks used in this invention are condensate range hydrocarbons having carbon number C5 to C20.

The catalyst system disclosed in this invention includes two types of zeolite in varied quantity namely medium pore pentasil zeolite and large pore high silica/alumina ratio USY zeolite (Si/Al>40), inert matrix material such as silica and/or clay, active matrix material and impregnated with cerium.

Active matrix of the catalyst is prepared by reacting Rural SB Grade Alumina slurry with formic acid. Inert matrix was prepared by mixing with clay & silica slurry with phosphate. The catalyst slurry was prepared by mixing active matrix and inert matrix with two types of zeolite slurry in varied quantity (medium pore pentasil zeolite and large pore high silica/alumina ratio USY zeolite). The catalyst slurry was again milled for homogenization and achieved solid content in the range of 25-35 wt. % and was spray dried, calcined to obtain the catalyst. The final catalyst was prepared by impregnation of cerium on spray dried calcined catalyst.

TABLE 1

Catalyst compositions of twelve samples:

| Catalyst Name/composition (in wt. %) | Cat-1 | Cat-2 | Cat-3 | Cat-4 | Cat-5 | Cat-6 | Cat-7 | Cat-8 | Cat-9 | Cat-10 | Cat-11 | Cat-12 |
|---|---|---|---|---|---|---|---|---|---|---|---|---|
| Active matrix (Alumina) | 10 | 10 | 10 | 10 | 10 | 10 | 10 | 10 | 10 | 10 | 10 | 10 |
| Inert matrix (Clay & silica) | 70 | 53 | 48 | 43 | 43 | 43 | 42 | 43 | 43 | 43 | 47 | 42 |
| ZSM-5 Zeolite (wt. %) | 10 | 25 | 30 | 25 | 25 | 25 | 25 | 25 | 25 | 25 | 30 | 25 |
| Si/Al (15) ratio USY Zeolite wt. % | 0 | 0 | 0 | 10 | 0 | 0 | 0 | 0 | 0 | 0 | 0 | 0 |
| Si/Al (30) ratio USY Zeolite wt. % | 0 | 0 | 0 | 0 | 10 | 0 | 0 | 0 | 0 | 0 | 0 | 0 |
| High Si/Al (40) ratio USY Zeolite wt. % | 0 | 0 | 0 | 0 | 0 | 0 | 0 | 10 | 0 | 0 | 0 | 0 |
| High Si/Al (50) ratio USY Zeolite wt. % | 0 | 0 | 0 | 0 | 0 | 0 | 0 | 0 | 0 | 0 | 0 | 0 |
| High Si/Al (60) ratio USY Zeolite wt. % | 0 | 0 | 0 | 0 | 0 | 10 | 10 | 0 | 0 | 0 | 0 | 10 |
| High Si/Al (80) ratio USY Zeolite wt. % | 0 | 0 | 0 | 0 | 0 | 0 | 0 | 0 | 0 | 10 | 0 | 0 |
| $PO_4$ (wt. %) | 10 | 12 | 12 | 12 | 12 | 12 | 12 | 12 | 12 | 12 | 12 | 12 |
| $Ce_2O_3$ | | | | | | | 1 (impregnated) | | | | 1 (impregnated) | 1 (mixed) |

Following examples further illustrate the present invention without limiting the scope of the invention:

EXAMPLE 1

Cat-1 to Cat-3 is prepared by incorporating only pentasil ZSM-5 zeolite at different quantity. Cat-4 to Cat-7 is prepared by incorporating two type of zeolite (pentasil ZSM-5 zeolite & USY Zeolite). Cat-4 & Cat-5 are prepared with low Silica/Alumina ratio (<40) USY zeolite, Whereas the Cat-6 & Cat-7 are prepared with high Silica/Alumina ratio (>40) USY zeolite. In addition Cat-7 was further impregnated with Cerium oxide. Catalyst 8, 9 and 10 are prepared with silica/alumina ratio of 40, 50 and 80. Catalyst 11 is prepared by cerium impregnated catalyst in the absence of USY zeolite. Catalyst 12 is prepared by cerium mixed catalyst as per the present invention.

products are analyzed by ASTM 2887 procedure in a Simulated Distillation Analyzer. The percentage of the liquid products boiling in the range of gasoline (C5-180° C.) and heavy hydrocarbon (180° C.+) is calculated. Carbon on catalyst was determined by off line C-S Analyzer. Detailed product yields on fresh feed basis with respect to each catalyst are mentioned below:

TABLE 3

Yields (wt. %) with different catalysts

|  | Cat-1 | Cat-2 | Cat-3 | Cat-4 | Cat-5 | Cat-6 | Cat-7 | Cat-8 | Cat-9 | Cat-10 | Cat-11 | Cat-12 |
| --- | --- | --- | --- | --- | --- | --- | --- | --- | --- | --- | --- | --- |
| DG (without C2=) | 6.79 | 6.82 | 7.49 | 7.56 | 6.80 | 7.43 | 8.12 | 6.93 | 7.53 | 7.35 | 7.61 | 7.78 |
| LPG (without C3= + C4=) | 7.48 | 7.60 | 7.83 | 7.93 | 7.62 | 8.10 | 9.12 | 7.77 | 8.2 | 7.98 | 7.92 | 8.61 |
| C2= + C3= + C4= | 39.36 | 42.15 | 41.25 | 42.26 | 41.18 | 47.26 | 50.23 | 45.41 | 47.95 | 46.88 | 42.39 | 48.75 |
| Gasoline (C5-180° C.) | 32.13 | 30.85 | 28.39 | 26.39 | 29.80 | 25.39 | 22.39 | 27.54 | 24.89 | 25.79 | 27.91 | 23.89 |
| 180° C. + Cut | 12.12 | 10.43 | 12.81 | 13.59 | 12.45 | 9.52 | 7.79 | 10.04 | 9.11 | 9.7 | 11.89 | 8.64 |
| Coke | 2.12 | 2.15 | 2.23 | 2.27 | 2.15 | 2.30 | 2.35 | 2.31 | 2.32 | 2.3 | 2.28 | 2.33 |

In the present invention a hydrocarbon feed stream, in gaseous form, is contacted with the catalysts as described above. The contacting of the hydrocarbon feed streams with the catalyst carries out in a circulating fluidized Bed (FCC)-type reactor. Reactor of this type is well known to those skilled in the art. In the process under the invention, the hydrocarbon feed is first preheated in the range of 150 to 400° C. and then injected to riser type cracking reactor. The reaction is carried out at elevated temperature as equivalent to riser top temperature of 550 to 650° C. and preferably in the range of 570 to 625° C. with higher catalyst to hydrocarbon ratio (8-20). The reaction conditions of the process are tabulated in Table 2. The product gas containing ethylene, propylene, C4 unsaturates, the unconverted hydrocarbon, ethane, propane, butanes, etc. and spent catalyst exit the reactor where the catalyst and gas are separated by cyclone. The separation process of gas and catalyst is well known to those skilled in the art. The spent catalyst with entrained hydrocarbons is then passed through a stripping section, where stripping of the catalyst is carried out in presence of steam to remove the hydrocarbon vapors from the spent catalyst. The stripped spent catalyst is regenerated in regenerator in presence of air at a temperature range of 630-700° C. to burn off the coke to achieve the targeted low carbon on regenerated catalyst (CRC) of lower than 0.1 wt. % on catalyst. The regenerated catalyst is circulated to riser reactor via stand pipe/slide valve.

TABLE 2

Reaction conditions

| Conditions | |
| --- | --- |
| Type of reactor | Circulating Fluidized Bed Reactor |
| Reactor pressure, Kg/cm$^2$ (g) | 1.5 |
| Reactor temperature, ° C. | 600 |
| Stripper temperature, ° C. | 600 |
| Regenerator temperature, ° C. | 690 |
| Feed rate, Kg/hr | 1.5 |
| C/O | 15 |

Different catalysts as mentioned above are tested in circulating fluidized bed pilot plant as above condition to crack the hydrocarbon feed stocks. The gas sample in each run is analyzed by off line Perkin Elmer GC. The $H_2$, C1, C2, C3, C4 and C5 lump is determined quantitatively. The liquid Performance results indicate that the yields of light olefins (C2=+C3=+C4=) are obtained in the similar range (39 to 42 wt. %) when the Cat-1 to Cat-5 are employed to crack hydrocarbon feedstock as mentioned in the present invention. In Cat-4 & Cat-5, although USY zeolite are being used, but it has low silica to alumina ratio (<40). Owing to low acidity, these catalyst are not able to produce light olefins beyond 42 wt. %. Catalyst 8, 9 and 10 having Si/Al ratio of 40, 50 and 80 respectively, show an increase in amount of light olefins (C2=+C3=+C4=) as compared to catalysts 1-5. However, Cat-6 which is having high silica/alumina ratio (>40) USY zeolite is capable of producing higher light olefins yields up to 47 wt. %. In the same manner, catalyst 11 having cerium impregnated catalyst but not having USY zeolite and catalyst 12 having cerium mixed catalyst do not is provide a good light olefins (C2=+C3=+C4=) yield. Further, incorporation of cerium in the Cat-7 enhances the dehydrogenation effect in the reactor over and above the Cat-6 yielding further improvement of light olefin yields from 47 wt. % to 50 wt. %.

We claim:

1. A process for catalytic cracking of hydrocarbon feed streams to light olefins, the process comprising contacting a hydrocarbon feed stream with a catalyst composition at reaction conditions to produce a mixture containing ethylene, propylene, and C4 unsaturates;
   wherein said catalyst composition comprises:
      a USY zeolite with a silica/alumina ratio of more than 40; a pentasil zeolite; a phosphate containing compound; and an alumina silica binder;
   wherein said catalyst is impregnated with cerium oxide.

2. The process as claimed in claim 1, wherein a yield of the mixture of ethylene, propylene, and C4 unsaturates is in the range of 39 wt. % to 55 wt. % of the hydrocarbon feed stream.

3. The process as claimed in claim 1, wherein the hydrocarbon feed stream is a natural gas condensate hydrocarbon feed.

4. The process as claimed in claim 1, wherein the hydrocarbon feed stream comprises 65-95 wt % C5-C20 hydrocarbons, 5-35 wt % aromatics, and optionally olefins.

5. The process as claimed in claim 1, wherein the reaction is carried out at a temperature range of 500 to 650° C.

6. The process as claimed in claim 1, wherein the catalyst is continuously circulated between a fluidized bed reactor, stripper and riser via a stand pipe and a side valve.

7. The process as claimed in claim 1, wherein the catalyst to hydrocarbon feed stream ratio ranges from 8 to 20.

8. The process as claimed in claim 1, wherein the catalyst is contacted with the hydrocarbon feed stream in a fluidization regime of a riser reactor of a circulating fluidized bed reactor—regenerator system.

\* \* \* \* \*